(12) United States Patent
Choi et al.

(10) Patent No.: US 11,418,116 B2
(45) Date of Patent: Aug. 16, 2022

(54) DC-DC CONVERTER FOR PHOTOVOLTAIC-LINKED ENERGY STORAGE SYSTEM AND CONTROL METHOD THEREFOR

(71) Applicant: LG INNOTEK CO., LTD., Seoul (KR)

(72) Inventors: Sang Gyu Choi, Seoul (KR); Jeong Heum Lee, Seoul (KR); Ju Young Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/271,718

(22) PCT Filed: Dec. 17, 2018

(86) PCT No.: PCT/KR2018/015990
§ 371 (c)(1),
(2) Date: Feb. 26, 2021

(87) PCT Pub. No.: WO2020/045759
PCT Pub. Date: Mar. 5, 2020

(65) Prior Publication Data
US 2021/0320589 A1    Oct. 14, 2021

(30) Foreign Application Priority Data

Aug. 30, 2018    (KR) .................. 10-2018-0102872

(51) Int. Cl.
*H02M 3/158*    (2006.01)
*H02J 3/38*    (2006.01)
(Continued)

(52) U.S. Cl.
CPC ............ *H02M 3/158* (2013.01); *H02J 3/381* (2013.01); *H02J 7/35* (2013.01); *H02M 1/14* (2013.01); *H02M 7/5387* (2013.01); *H02S 40/32* (2014.12); *H02S 40/38* (2014.12); *H02J 2300/24* (2020.01)

(58) Field of Classification Search
CPC ...... H02M 3/158; H02M 1/14; H02M 7/5387; H02S 40/32; H02S 40/38; H02J 3/38; H02J 3/381; H02J 7/35; H02J 2300/24
See application file for complete search history.

(56) References Cited

U.S. PATENT DOCUMENTS

2006/0171182 A1    8/2006    Siri et al.
2012/0229055 A1    9/2012    Sugiura et al.
2016/0285355 A1    9/2016    Lee et al.

FOREIGN PATENT DOCUMENTS

JP    2012-186947 A    9/2012
KR    10-2014-0062325 A    5/2014
(Continued)

*Primary Examiner* — Robert L Deberadinis
(74) *Attorney, Agent, or Firm* — Birch, Stewart, Kolasch & Birch, LLP

(57) ABSTRACT

According to one embodiment, a DC-DC converter for compensating a ripple in a photovoltaic-linked energy storage system and a control method thereof are disclosed. Particularly, a DC-DC converter for compensating for a ripple generated in a DC link connecting a single-phase inverter to a converter is disclosed. The DC-DC converter can compensate a ripple by using an active power component or the average voltage of a DC link voltage acquired from the DC link.

20 Claims, 7 Drawing Sheets

(51) Int. Cl.
*H02S 40/32* (2014.01)
*H02S 40/38* (2014.01)
*H02J 7/35* (2006.01)
*H02M 1/14* (2006.01)
*H02M 7/5387* (2007.01)

(56) References Cited

FOREIGN PATENT DOCUMENTS

KR 10-2015-0071508 A 6/2015
WO WO 2013/013858 A1 1/2013

DC-DC CONVERTER FOR PHOTOVOLTAIC-LINKED ENERGY STORAGE SYSTEM AND CONTROL METHOD THEREFOR

CROSS REFERENCE TO RELATED APPLICATIONS

This application is the National Phase of PCT International Application No. PCT/KR2018/015990, filed on Dec. 17, 2018, which claims priority under 35 U.S.C. 119(a) to Patent Application No. 10-2018-0102872, filed in the Republic of Korea on Aug. 30, 2018, all of which are hereby expressly incorporated by reference into the present application.

TECHNICAL FIELD

In the present disclosure, in a photovoltaic-linked energy storage system, a DC-DC converter and a control method thereof compensating for ripple are disclosed.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of photovoltaic modules is converted to AC power through an inverter, and thus, it can be immediately used in industrial facilities.

Meanwhile, in the case of solar power supply generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, when a single-phase inverter is connected to the single-phase power grid, there is a problem that ripple may occur in the DC link.

DETAILED DESCRIPTION OF THE INVENTION

Technical Subject

The present disclosure may disclose a DC-DC converter and a control method thereof compensating for DC link ripple in a photovoltaic-linked energy storage system. Specifically, a DC-DC converter and a control method thereof compensating for ripple generated when linked to a single-phase grid are disclosed. Of course, the technical problem to be solved is not limited to the technical problems as described above, and various technical problems may be further included within a scope that is obvious to a person skilled in the art.

Technical Solution

A DC-DC converter according to the first aspect comprises: a DC link to which solar power supply is applied; a converting circuit including a plurality of switches; and a processor for compensating for a ripple of a DC link voltage applied to the DC link by using a power of a battery connected to the converting circuit, wherein the processor obtains an active power component of the DC link voltage and compensate the ripple by applying a control signal obtained by using the active power component to the converting circuit.

In addition, the processor separates the DC link voltage into an alpha signal and a beta signal, and can obtain the active power component through synchronous conversion of the alpha signal and the beta signal.

In addition, the alpha signal and the beta signal may have a phase difference of 90 degrees.

In addition, the processor may obtain the control signal from the active power component through proportional integral control.

In addition, a single-phase inverter for supplying power to a single-phase grid is connected to the DC link, and the ripple may be generated by the single-phase grid.

In addition, a single-phase inverter for supplying power through a single-phase grid is connected to the DC link, and wherein the processor obtains a frequency component of a size corresponding to two times of a frequency being used in the single-phase grid from the DC link voltage, and obtains the active power component from the obtained frequency component.

In addition, the processor may obtain the control signal through synchronous conversion and synchronous reverse conversion.

In addition, the control signal may include a pulse width modulation (PWM) signal.

In addition, the converting circuit may include a first field effect transistor (FET) and a second FET connected in series.

In addition, the converting circuit may convert power received from the solar power supply source and supply the converted power to the battery.

A DC-DC converter control method according to a second aspect may comprise the steps of: receiving a DC link voltage from a DC link to which solar power supply is applied; obtaining an active power component of the DC link voltage; acquiring a control signal for compensating a ripple included in the DC link voltage using the active power component; and compensating the ripple included in the DC link voltage by applying the control signal to a converting circuit including a plurality of switches.

In addition, the third aspect can provide a computer-readable recording medium in which a program for executing the method of the second aspect on a computer is recorded.

In addition, the DC-DC converter according to the fourth aspect comprises: a DC link to which solar power supply is applied; a converting circuit including a plurality of switches; and a processor for compensating a ripple of a DC link voltage applied to the DC link by using power of a battery connected to the converting circuit, wherein the processor may obtains an average voltage of the DC link voltage and compensate the ripple by applying a control signal to the converting circuit using the difference value between the DC link voltage and the average voltage.

Advantageous Effects

The present disclosure may disclose a DC-DC converter and a control method thereof compensating DC link ripple in a photovoltaic-linked energy storage system.

BEST MODE

Hereinafter, embodiments of the present invention will be described in detail with reference to the accompanying drawings. However, the technical idea of the present invention is not limited to some embodiments to be described, but may be implemented in various forms, and if it is within the scope of the technical idea of the present invention, one or more of the components may be selected, combined, and substituted between the embodiments for use. In addition, terms (including technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology. In addition, terms used in the embodiments of the present invention are for describing the embodiments and are not intended to limit the present invention. In the present specification, the singular form may include the plural form unless specifically stated in the phrase, and when described as "at least one (or more than one) of A and B and C", it may contain one or more of all combinations that can be combined with A, B, and C. In addition, terms such as first, second, A, B, (a), (b), and the like may be used in describing the components of the embodiment of the present invention. These terms are only for distinguishing the component from other components, and are not limited to the nature, order, or order of the component by the term. And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components. In addition, when it is described as being formed or disposed in the "top (upper side) or bottom (lower side)" of each component, the top (upper side) or bottom (lower side) not only includes a case when the two components are in direct contact with each other but also includes a case where one or more other components are formed or disposed between the two components. In addition, when expressed as "top (upper side) or bottom (lower side)", the meaning of not only an upward direction but also a downward direction based on one component may be included.

Hereinafter, embodiments of the present invention will be described in detail with reference to the drawings.

Figure 1:
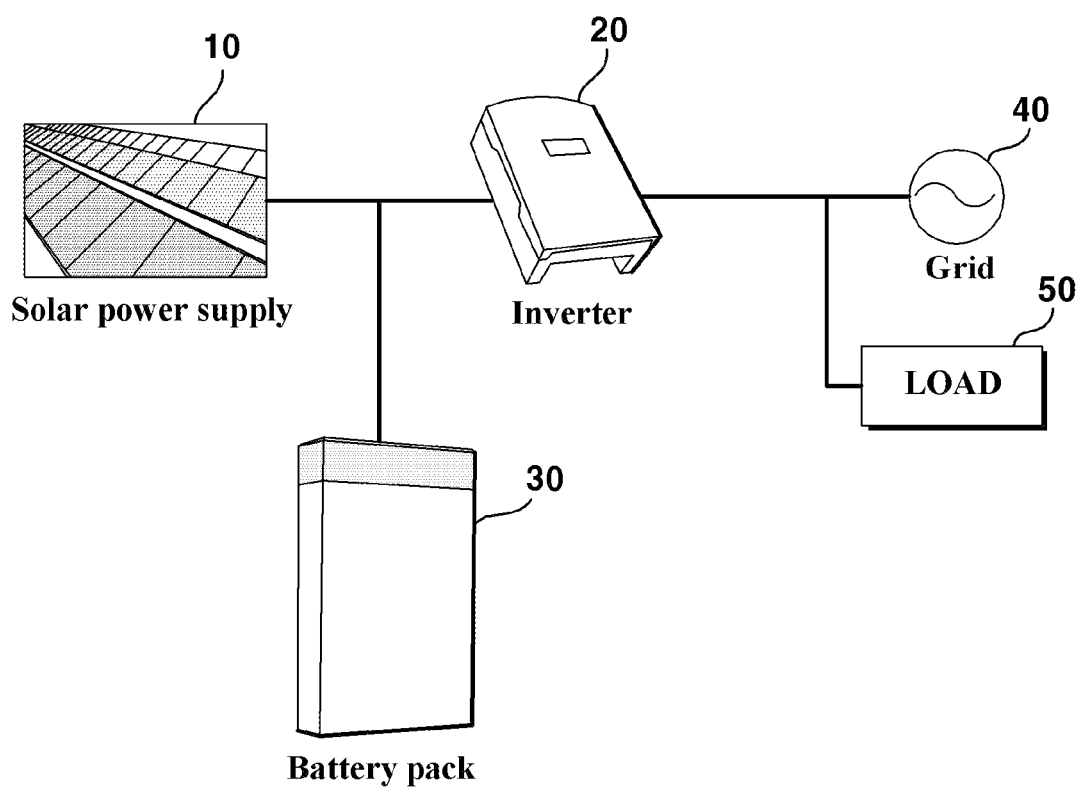
FIG. 1 is a diagram illustrating a solar power generation system according to an embodiment. A photovoltaic-linked energy storage system may be an example of a solar power supply system.

FIG. 1 is a diagram illustrating a solar power generation system according to an embodiment. The solar-linked energy storage system may be an example of a solar power generation system.

As illustrated in FIG. 1, a solar power generation system may comprise a solar power supply 10, a single-phase inverter 20, a battery pack 30, and a load 50.

However, it can be understood by a person skilled in the art that general-purpose components other than the components illustrated in FIG. 1 may be further included in the solar power generation system. For example, the solar power generation system may further include a single-phase grid 40. Or, according to another embodiment, it may be understood by a person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the single-phase grid 40 or the load 50, the single-phase inverter 20 according to an embodiment may convert a direct current (DC) power generated by the solar power supply 10 by the photoelectric effect to an alternating current (AC) power. Here, the single-phase grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the single-phase inverter 20 controls the voltage generated from the solar power supply 10 to find the maximum power and supply it to the single-phase grid 40. At this time, when a case occurs in that the power for operating the single-phase inverter 20 is lower than the output power of the single-phase inverter 20, the single-phase inverter 20 may consume the power of the single-phase grid 40 in reverse. Of course, in this case, the single-phase inverter 20 may prevent power from being reversed by blocking the power flowing into the single-phase grid 40. Accordingly, various optimal control methods for extracting maximum power from the solar power supply 10 are applied to the solar power generation system, so that the above-described operation of the single-phase inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10, so that the rate of change of the power with respect to the change of the operating point of the terminal voltage of the array becomes '0'. The CV control method is a method of controlling the solar power supply 10 with a constant reference voltage (refV) regardless of the operating voltage or power of the array. According to each optimal control method, a power source input from the solar power supply 10 to the single-phase inverter 20 may operate as a voltage source or a current source.

The load 50 according to an embodiment may refer to a product using an electricity type used in real life. For example, the single-phase inverter 20 may obtain AC power of a desired voltage and frequency through an appropriate conversion method, or a switching element, or a control circuit, and may supply electricity to home appliances in general homes or machinery products in industrial facilities.

In addition, in the case of solar power supply generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the single-phase inverter 20 and the battery pack 30 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the single-phase inverter 20 and the battery pack 30 may communicate with each other through wired communication or wireless communication. For example, the single-phase inverter 20 and the battery pack 30 may comprise a Wi-Fi chip, a Bluetooth chip, a wireless communication chip, an NFC chip, or the like. Of course, the single-phase inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, ZigBee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Figure 2:
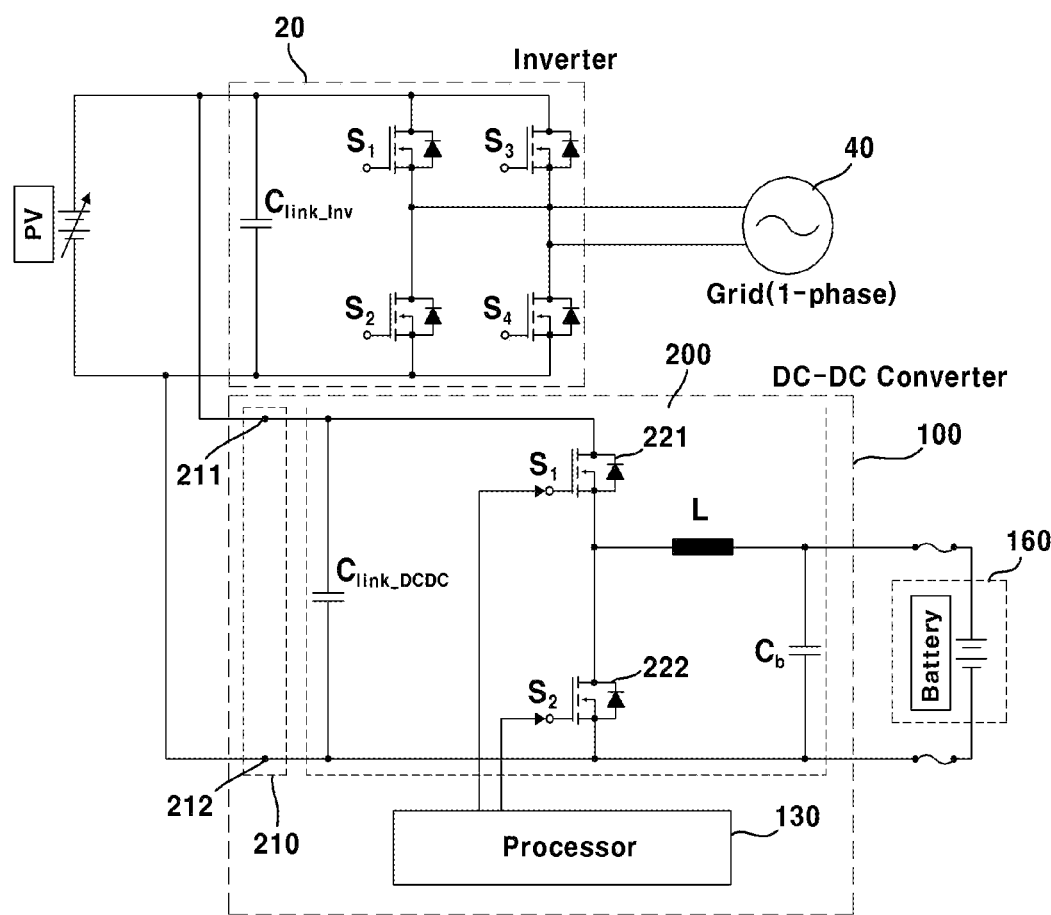
FIG. 2 is a block diagram illustrating an example in which a DC-DC converter is connected to a single-phase inverter and operates according to an embodiment.

FIG. 2 is a block diagram illustrating an example in which a DC-DC converter 100 is connected to a single-phase inverter 20 and operates according to an embodiment.

As illustrated in FIG. 2, the single-phase inverter 20 and the DC-DC converter 100 may be connected and operated. Referring to FIG. 2, the DC-DC converter 100 may include a DC link 210, a converting circuit 200, and a processor 130. In addition, the DC link 210 may include a first node 211 and a second node 212. In addition, the converting circuit 200 may include a first switch 221 and a second switch 222.

However, it can be understood by a person skilled in the art that other general-purpose components other than the components illustrated in FIG. 2 may be further included in the single-phase inverter 20 or the DC-DC converter 100. For example, the DC-DC converter 100 may further include a memory (not shown). Or, according to another embodiment, it may be understood by a person skilled in the art that some of the components illustrated in FIG. 2 may be omitted.

Power may be applied from the solar power supply 10 to the DC link 210. A single-phase inverter 20 that supplies power to the single-phase grid 40 is connected to the DC link 210, and a ripple may be generated by the single-phase grid 40. Since the power applied from the solar power supply 10 is DC, but AC is applied in the single-phase grid 40 connected to the single-phase inverter 20, a ripple may occur in the DC link 210 by the single-phase grid 40

The converting circuit 200 may convert power received from the solar power supply 10 and supply the converted power to the battery 160. Specifically, the converting circuit 200 may convert a voltage applied to the DC link 210 and apply it to the battery 160. Or, the converting circuit 200 may convert a voltage applied from the battery 160 and apply it to the DC link 210. For example, the DC-DC converter 100 may charge the battery 160 by using the power generated by the solar power supply 10 when sufficient power is generated from the solar power supply 10. As another example, when the DC-DC converter 100 does not generate sufficient power from the solar power supply 10 and the remaining amount of the battery 160 is sufficient, power can be supplied to the single-phase inverter 20 by using the power of the battery 160.

The converting circuit 200 according to an embodiment may convert power received from the solar power supply 10.

For example, the converting circuit 200 may convert a voltage of power applied from the solar power supply 10. Specifically, the converting circuit 200 may convert a voltage using a plurality of switches 221 and 222 included in the converting circuit 200. The plurality of switches 221 and 222 may operate according to a control signal received from the processor 130.

The converting circuit 200 may include a capacitor, an inductor, a resistor, a switch, and the like, and may be configured as a half bridge or a full bridge.

The processor 130 may compensate a ripple of the DC link voltage applied to the DC link 210 by using the power of the battery 160 connected to the converting circuit 200. For example, the processor 130 may compensate a ripple of the DC link voltage applied to the DC link 210 by controlling a plurality of switches 221 and 222 included in the converting circuit 200. Specifically, the processor 130 obtains an active power component of the DC link voltage, and the ripple may be compensated by applying a control signal, which is obtained by using an active power component, to the converting circuit 200.

The processor 130 may separate the DC link voltage into an alpha signal and a beta signal, and obtain an active power component through synchronous conversion of the alpha and beta signals. Here, the alpha signal and the beta signal may have a phase difference of 90 degrees.

The processor 130 may perform filtering on a DC link voltage and phase conversion, and separate an alpha signal and a beta signal. In addition, the processor 130 obtains an active power component through synchronous conversion of the separated alpha signal and beta signal, and may perform proportional integral control by merging a compensation command for an active power component.

The processor 130 obtains a control signal by performing proportional integral control on the active power component obtained from the DC link voltage, and applies the control signal to the converting circuit 200 to compensate a ripple.

The processor 130 may obtain a frequency component of a size corresponding to two times of the frequency being used in the single-phase grid 40 from the DC link voltage, and obtain an active power component from the obtained frequency component. In addition, the processor 130 may perform band pass filtering when obtaining a specific frequency component. Signal conversion, such as band pass filtering, may be performed digitally. For example, band pass filtering may be performed through a digital filter.

The processor 130 may obtain a control signal through synchronous conversion and reverse synchronous conversion. Specifically, the processor 130 may extract an active power component by performing synchronous conversion on the separated alpha signal and beta signal. In addition, the processor 130 may obtain a control signal by performing reverse synchronous conversion on the signal on which the proportional integral control has been performed.

The control signal may include a pulse width modulation (PWM) signal. Specifically, the control signal may include a signal applied to the plurality of switches 221 and 222, and the control signal applied to the plurality of switches 221 and 222 may be in the form of a square wave or a pulse wave.

The converting circuit 200 may include a first field effect transistor (FET) 221 and a second FET 222 connected in series. The first FET 221 and the second FET 222 may be connected in series, and the converting circuit 200 may be configured as a half bridge, as illustrated in FIG. 2.

Figure 3:
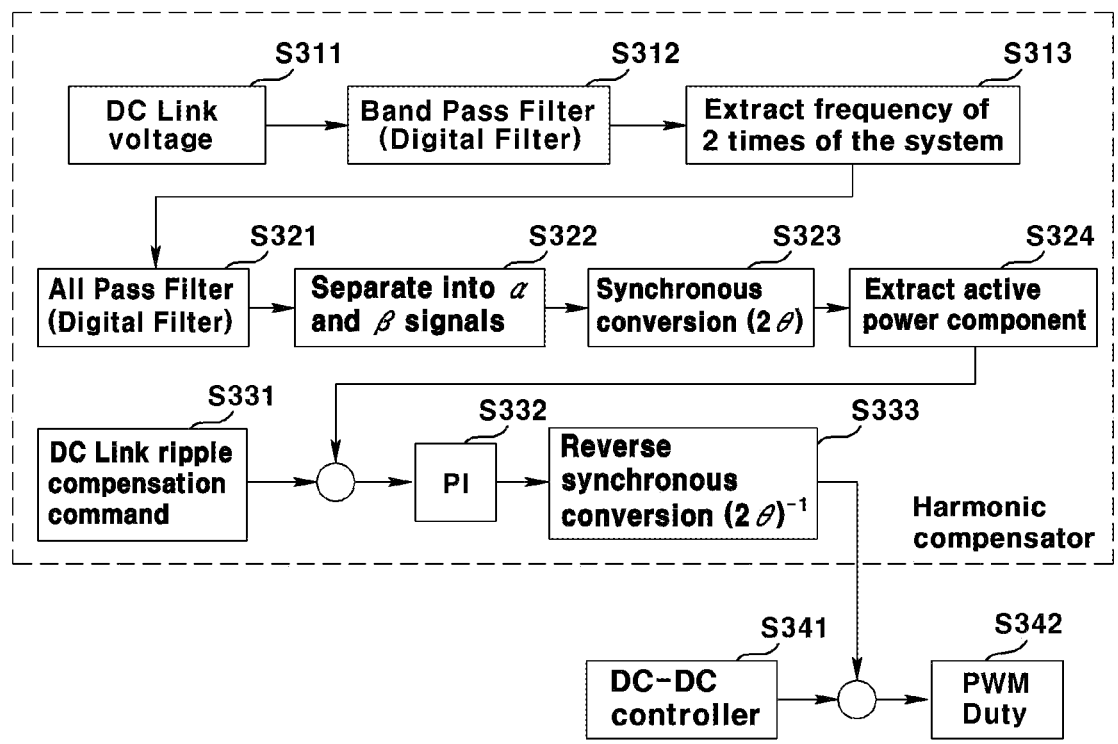
FIG. 3 is a flow chart specifically illustrating a method of obtaining a control signal by a DC-DC converter according to an embodiment.

FIG. 3 is a flow chart specifically illustrating a method of obtaining a control signal by a DC-DC converter 100 according to an embodiment.

In step S311, the DC-DC converter 100 according to an embodiment acquires a DC link voltage, and in step S312, the DC-DC converter 100 according to an embodiment may perform a band pass filtering on the DC link voltage obtained in step S311.

In step S313, the DC-DC converter 100 according to an embodiment acquires a frequency component of a size corresponding to two times of the frequency being used in the single-phase grid 40, and in step S321, the DC-DC converter 100 according to the embodiment may perform phase conversion on the obtained frequency component.

In step S322, the DC-DC converter 100 according to an embodiment separates the phase-converted signal into an alpha signal and a beta signal. The alpha signal and the beta signal may have a phase difference by a predetermined magnitude (e.g., 90 degrees).

In step S323, the DC-DC converter 100 according to an embodiment performs synchronous conversion on the separated alpha signal and beta signal, and in step S324, the DC-DC converter 100 according to an embodiment extracts an active power component.

In step S331, the DC-DC converter 100 according to an embodiment outputs a command for compensating DC link ripple, and in step S332, the DC-DC converter 100 according to an embodiment performs proportional integral control using the command outputted in step S331 and the active power component extracted in step S324.

In step S333, the DC-DC converter 100 according to an embodiment performs a reverse synchronous conversion on the result of performing the proportional integral control; in step S341, the DC-DC converter 100 according to an embodiment acquires a signal for controlling the DC-DC converter 100; and in step S342, the DC-DC converter 100 according to an embodiment may generate a control signal for controlling the first switch 221 and the second switch 222, by using the signal acquired in step S333 and the signal acquired in step S341.

Step S311, step S312, step S313, step S321, step S322, step S323, step S324, step S331, step S332, and step S333 may be performed in a harmonic compensator (not shown), and since the operation of the harmonic compensator according to an example can be performed digitally, substantially the operation in each step illustrated in FIG. 3 may be performed in the processor 130.

Figure 4:
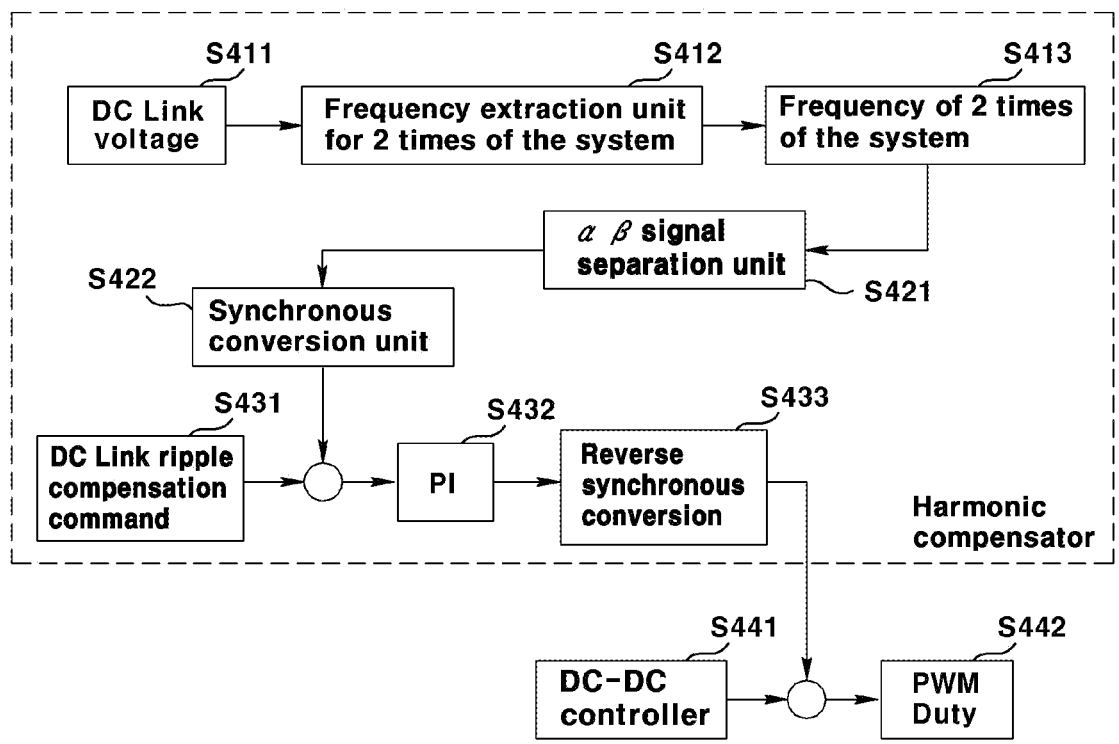
FIG. 4 is a flowchart briefly illustrating a method of obtaining a control signal by a DC-DC converter according to an embodiment.

FIG. 4 is a flowchart briefly illustrating a method of obtaining a control signal by a DC-DC converter 100 according to an embodiment.

FIG. 4 is disclosed by omitting some of the contents described in FIG. 3. Specifically, since step S411, step S412, step S421, step S422, step S431, step S432, step S433, step S441, and step S442 are respectively correspond to step S311, step S313, step S322, step S324, step S331, step S332, step S333, step S341, and step S342, detailed description will be omitted to simplify the overall description.

In step S413 disclosed in FIG. 4, the DC-DC converter 100 may transmit the frequency extracted in S412 to separate an alpha signal and a beta signal.

Step S411, step S412, step S413, step S421, step S422, step S431, step S432, and step S433 may be performed in a harmonic compensator (not shown), and since the operation of the harmonic compensator according to an example can be performed digitally, substantially, the operation in each step illustrated in FIG. 4 may be performed in the processor 130. For example, the processor 130 may perform synchronous conversion in step S422. Synchronous conversion may mean a type of conversion method in which frequency components are excluded in controlling and controlling is performed only by size.

Figure 5:
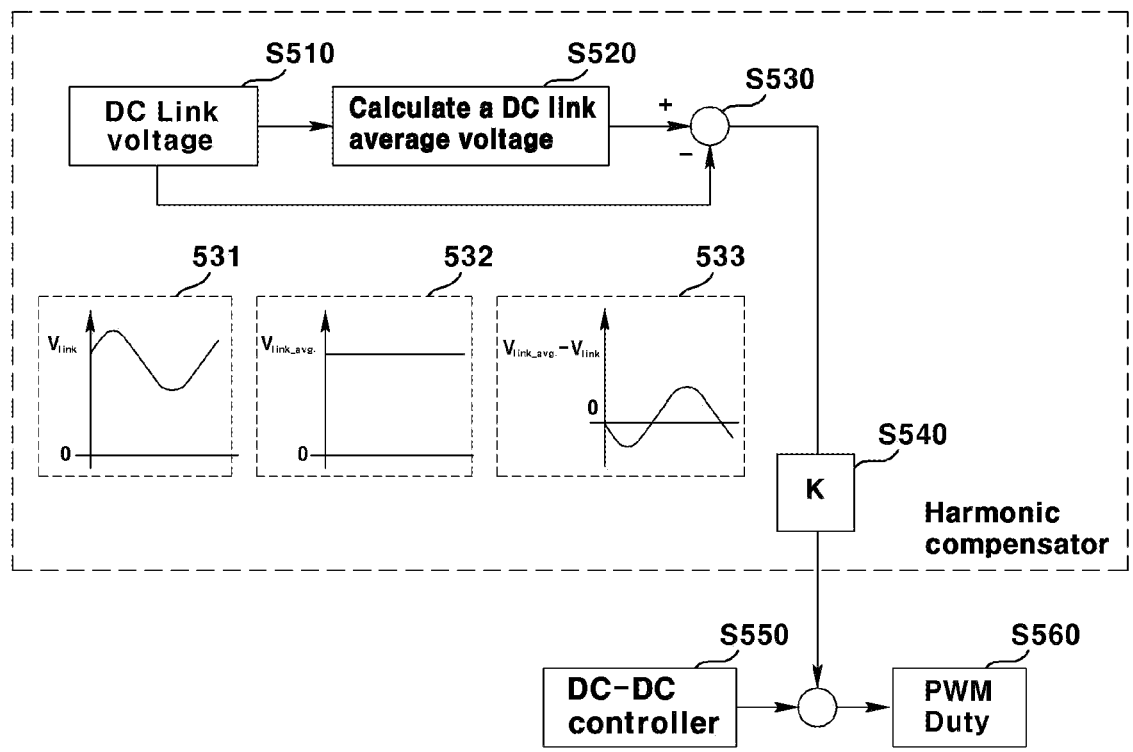
FIG. 5 is a flowchart illustrating an example in which a DC-DC converter compensates a ripple using an average voltage according to an embodiment.

FIG. 5 is a flowchart illustrating an example in which a DC-DC converter 100 compensates a ripple using an average voltage according to an embodiment.

In step S510, the DC-DC converter 100 according to an embodiment acquires a DC link voltage. The DC link voltage according to an embodiment is illustrated in a first graph 531. As can be seen from the first graph 531, the DC link voltage may include an AC component. The AC component included in the DC link voltage may be a ripple.

In step S520, the DC-DC converter 100 according to an embodiment may determine an average voltage of the DC link voltage. The average voltage according to an embodiment is illustrated in the second graph 532.

In step S530, the DC-DC converter 100 according to an embodiment may determine a difference value between the DC link voltage and the average voltage. The difference value according to an embodiment is illustrated in the third graph 533.

In step S540, the DC-DC converter 100 according to an embodiment may convert and output the value outputted in step S530. For example, in step S540, the DC-DC converter 100 according to an embodiment may perform signal amplification (e.g., K times).

In step S550, the DC-DC converter 100 according to an embodiment acquires a signal for controlling the DC-DC converter 100, and in step S560, the DC-DC converter 100 according to an embodiment controls can generate a control signal for controlling the first switch 221 and the second switch 222 by using the signal acquired in step S540 and the signal acquired in step S550.

Figure 6:
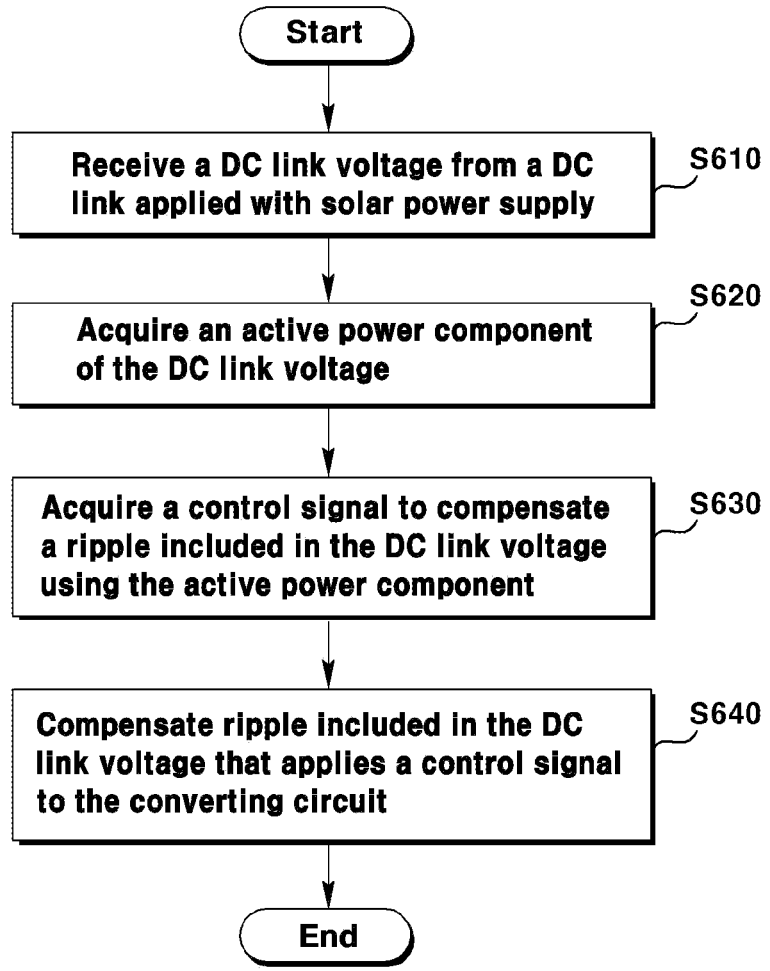
FIG. 6 is a flowchart illustrating a method of controlling a DC-DC converter according to an embodiment.

FIG. 6 is a flowchart illustrating a method of controlling a DC-DC converter 100 according to an embodiment.

In step S610, the DC-DC converter 100 according to an embodiment receives the DC link voltage from the DC link 210 to which the solar power supply is applied. The DC-DC converter 100 and the single-phase inverter 20 may be connected through the DC link 210.

In step S620, the DC-DC converter 100 according to an embodiment obtains an active power component of the DC link voltage. The DC-DC converter 100 may separate the DC link voltage into an alpha signal and a beta signal, and obtain an active power component through synchronous conversion of the alpha and beta signals.

In step S630, the DC-DC converter 100 according to an exemplary embodiment obtains a control signal for compensating a ripple included in the DC link voltage by using an active power component.

DC-DC converter 100 performs a proportional integral control by merging the compensation command for the active power component, thereby possibly obtaining a control signal by performing the proportional integral control.

In step S640, the DC-DC converter 100 according to an embodiment applies a control signal to the converting circuit 200 including a plurality of switches to compensate a ripple included in the DC link voltage.

The control signal may include a pulse width modulation (PWM) signal. Specifically, the control signal may include a signal applied to the plurality of switches 221 and 222, and the control signal applied to the plurality of switches 221 and 222 may be in the form of a square wave or a pulse wave.

Figure 7:
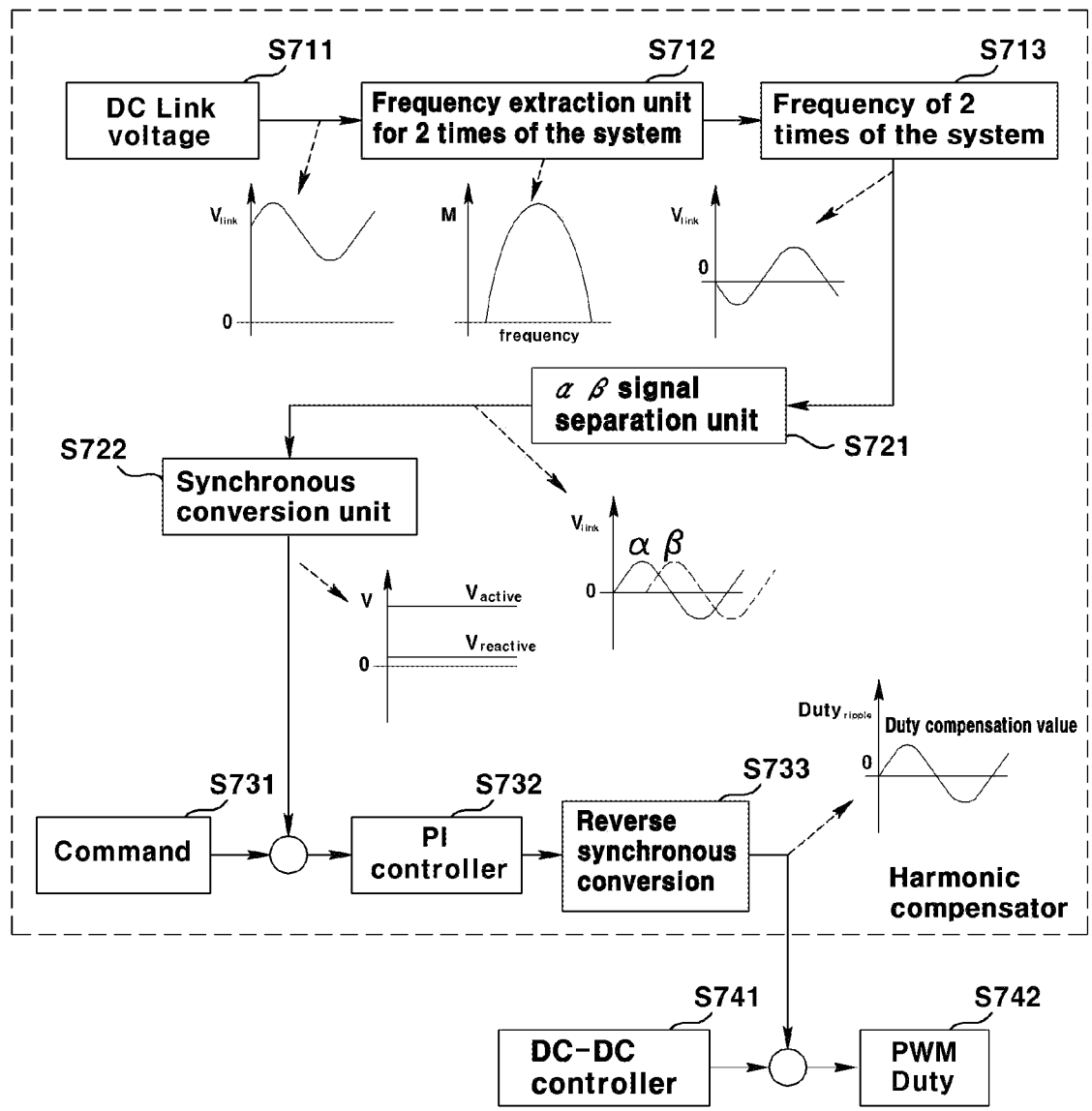
FIG. 7 is a flowchart illustrating a method of obtaining a control signal by a DC-DC converter according to an exemplary embodiment through a graph.

FIG. 7 is a flowchart illustrating a method of obtaining a control signal by a DC-DC converter according to an exemplary embodiment through a graph.

FIG. 7 discloses the contents described in FIG. 4 together with some graphs. Specifically, since step S711, step S712, step S713, step S721, step S722, step S731, step S732, step S733, step S741, and step S742 are respectively correspond to step S411, step S412, step S413, step S421, and step S422, step S431, step S432, step S433, step S441, and step S442, detailed description will be omitted to simplify the overall description.

Also, an example of a signal outputted in each step may be referred to the graph illustrated in FIG. 7. For example, it can be seen that the alpha signal and the beta signal, which are signals outputted in step S721, have a phase difference equal to a predetermined value.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like).

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
a DC link to which solar power supply is applied;
a converting circuit including a plurality of switches; and
a processor for compensating for a ripple of a DC link voltage applied to the DC link by using a power of a battery connected to the converting circuit,
wherein the processor obtains an active power component of the DC link voltage and compensate the ripple by applying a control signal obtained by using the active power component to the converting circuit.

2. The DC-DC converter according to claim 1, wherein the processor separates the DC link voltage into an alpha signal and a beta signal and obtains the active power component through synchronous conversion of the alpha signal and the beta signal.

3. The DC-DC converter according to claim 2, wherein the alpha signal and the beta signal have a phase difference of 90 degrees.

4. The DC-DC converter according to claim 1, wherein the processor obtains the control signal from the active power component through proportional integral control.

5. The DC-DC converter according to claim 1, wherein a single-phase inverter for supplying power to a single-phase grid is connected to the DC link, and
wherein the ripple is generated by the single-phase grid.

6. The DC-DC converter according to claim 1, wherein a single-phase inverter for supplying power through a single-phase grid is connected to the DC link, and
wherein the processor obtains a frequency component of a size corresponding to two times of a frequency being used in the single-phase grid from the DC link voltage, and obtains the active power component from the obtained frequency component.

7. The DC-DC converter according to claim 1, wherein the processor obtains the control signal through synchronous conversion and synchronous reverse conversion.

8. The DC-DC converter according to claim 1, wherein the control signal includes a pulse width modulation (PWM) signal.

9. The DC-DC converter according to claim 1, wherein the converting circuit includes a first FET (field effect transistor) and a second FET connected in series.

10. The DC-DC converter according to claim 1, wherein the converting circuit converts a power received from the solar power supply to supply the converted power to the battery.

11. A DC-DC converter control method comprising:
receiving a DC link voltage from a DC link to which solar power supply is applied;
obtaining an active power component of the DC link voltage;
acquiring a control signal for compensating a ripple included in the DC link voltage using the active power component; and
compensating the ripple included in the DC link voltage by applying the control signal to a converting circuit including a plurality of switches.

12. The DC-DC converter control method according to claim 11, wherein the obtaining the active power component of the DC link voltage comprises:
separating the DC link voltage into an alpha signal and a beta signal; and
obtaining the active power component through synchronous conversion of the alpha signal and the beta signal.

13. The DC-DC converter control method according to claim 12, wherein the alpha signal and the beta signal have a phase difference of 90 degrees.

14. The DC-DC converter control method according to claim 11, wherein the control signal is obtained from the active power component through proportional integral control.

15. The DC-DC converter control method according to claim 11, wherein a single-phase inverter for supplying power to a single-phase grid is connected to the DC link, and wherein the ripple is generated by the single-phase grid.

16. The DC-DC converter control method according to claim 11, wherein a single-phase inverter for supplying power through a single-phase grid is connected to the DC link, and
wherein the obtaining an active power component of the DC link voltage comprises:
obtaining a frequency component of a size corresponding to two times of a frequency being used in the single-phase grid from the DC link voltage; and
obtaining the active power component from the obtained frequency component.

17. The DC-DC converter control method according to claim 11, wherein the control signal is obtained through synchronous conversion and synchronous reverse conversion.

18. The DC-DC converter control method according to claim 11, wherein the control signal includes a pulse width modulation (PWM) signal.

19. The DC-DC converter control method according to claim 11, wherein the converting circuit includes a first FET (field effect transistor) and a second FET connected in series.

20. A DC-DC converter comprising:
a DC link to which solar power supply is applied;
a converting circuit including a plurality of switches; and
a processor for compensating for a ripple of a DC link voltage applied to the DC link by using a power of a battery connected to the converting circuit,
wherein the processor obtains an average voltage of the DC link voltage and compensates the ripple by applying a control signal to the converting circuit by using a difference value between the DC link voltage and the average voltage.

* * * * *